United States Patent [19]

Yonezawa

[11] Patent Number: 4,989,630
[45] Date of Patent: Feb. 5, 1991

[54] QUICK-ACTING COUPLING

[75] Inventor: Keitaro Yonezawa, Nadaku Kobe, Japan

[73] Assignee: Kabushiki Kaisha KOSMEK, Hyogoken, Japan

[21] Appl. No.: 543,988

[22] Filed: Jun. 22, 1990

Related U.S. Application Data

[62] Division of Ser. No. 423,276, Oct. 18, 1989.

[30] Foreign Application Priority Data

Oct. 21, 1988 [JP] Japan .................................. 63-266815
Nov. 29, 1988 [JP] Japan ........................... 63-156341[U]

[51] Int. Cl.$^5$ ............................................. F16K 49/00
[52] U.S. Cl. ...................................... 137/240; 137/614; 285/13
[58] Field of Search .................. 137/614, 614.03, 240; 285/13

[56] References Cited

U.S. PATENT DOCUMENTS 3,240,225 3/1966 Barrows ......................... 137/614 X
3,429,588 2/1969 Nelson ................................. 285/96 X
4,253,684 3/1981 Tolbert et al. ....................... 285/13

FOREIGN PATENT DOCUMENTS 60-52496 4/1985 Japan .

*Primary Examiner*—John C. Fox
*Attorney, Agent, or Firm*—Lowe, Price, LeBlanc, Becker & Shur

[57] ABSTRACT

A first coupling (51) and a second coupling (52) composing a quick-acting coupling (26) are respectively provided with check valve bodies (54)(154) and non-spill valve bodies (55)(155). When both the couplings (51)(52) are manipulated for the disconnection thereof, a leak of liquid is adapted to be prevented by means of the respective check valve bodies (54)(154) as well as a spill of liquid is adapted to be prevented by means of the non-spill valve bodies (55)(155). The respective non-spill valve bodies (55)(155) are fitted slidably inside respective non-spill valve port surfaces (71)(171) so as to carry out a liquid sealing respectively. Further, at the time of disconnecting manipulation of the coupling (26), a volume of the liquid phase portion within a non-spill valve casing chamber (63) is adapted to be increased by the movement of a non-spill valve casing (56) in which the first non-spill valve body (55) is fitted.

2 Claims, 10 Drawing Sheets

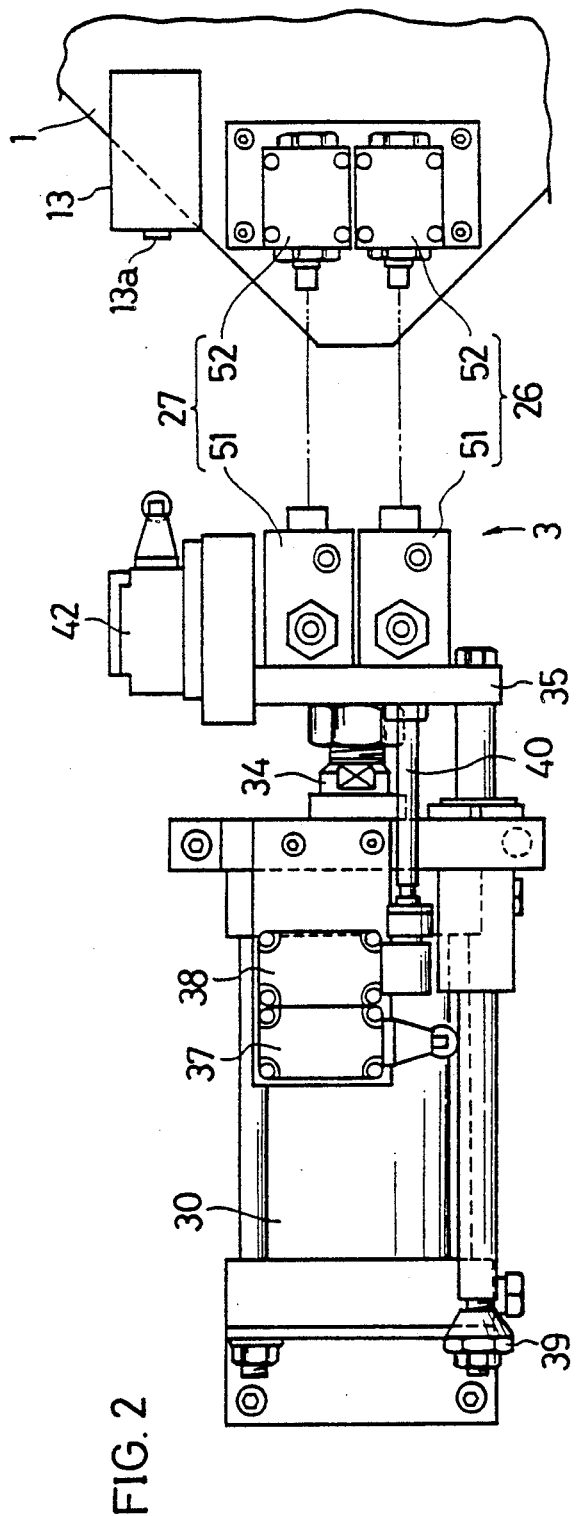
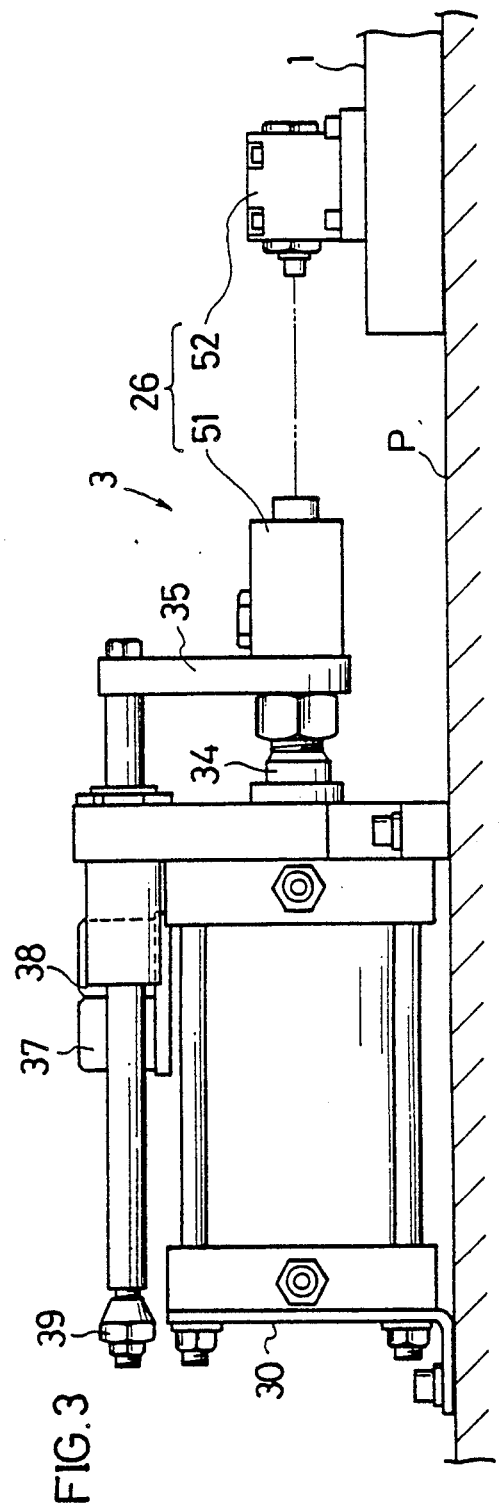
FIG. 2
FIG. 3

FIG. 4
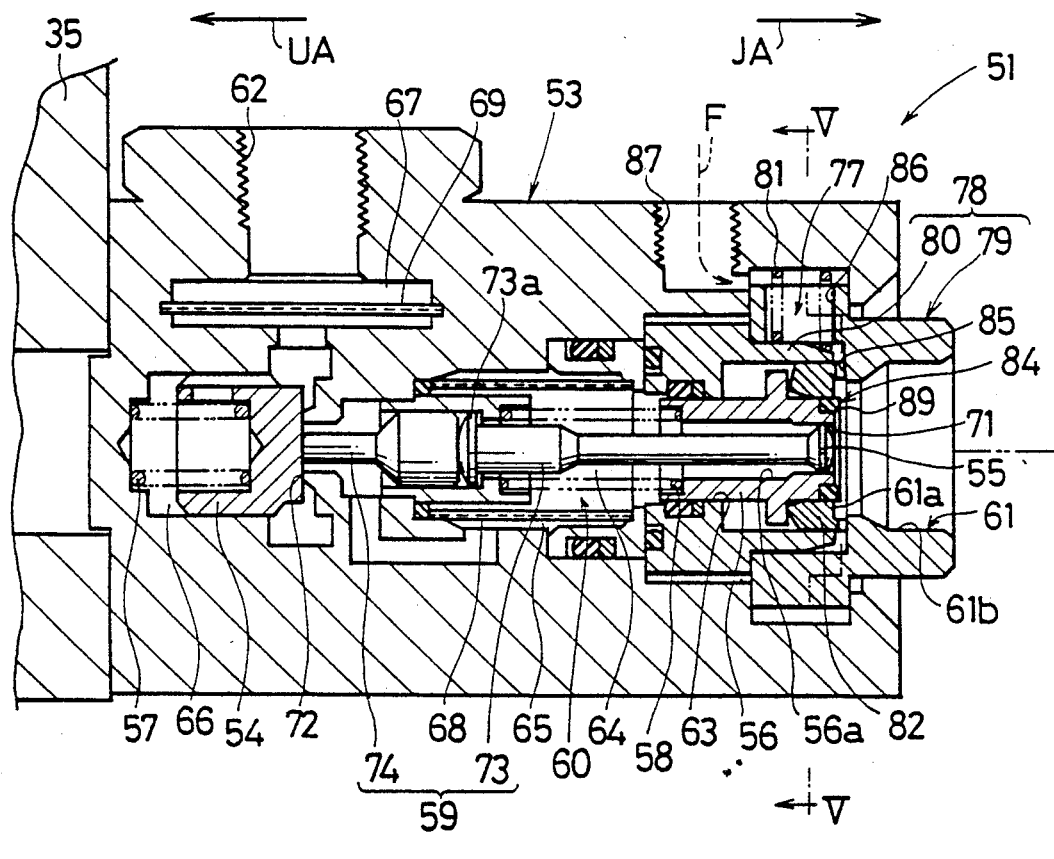
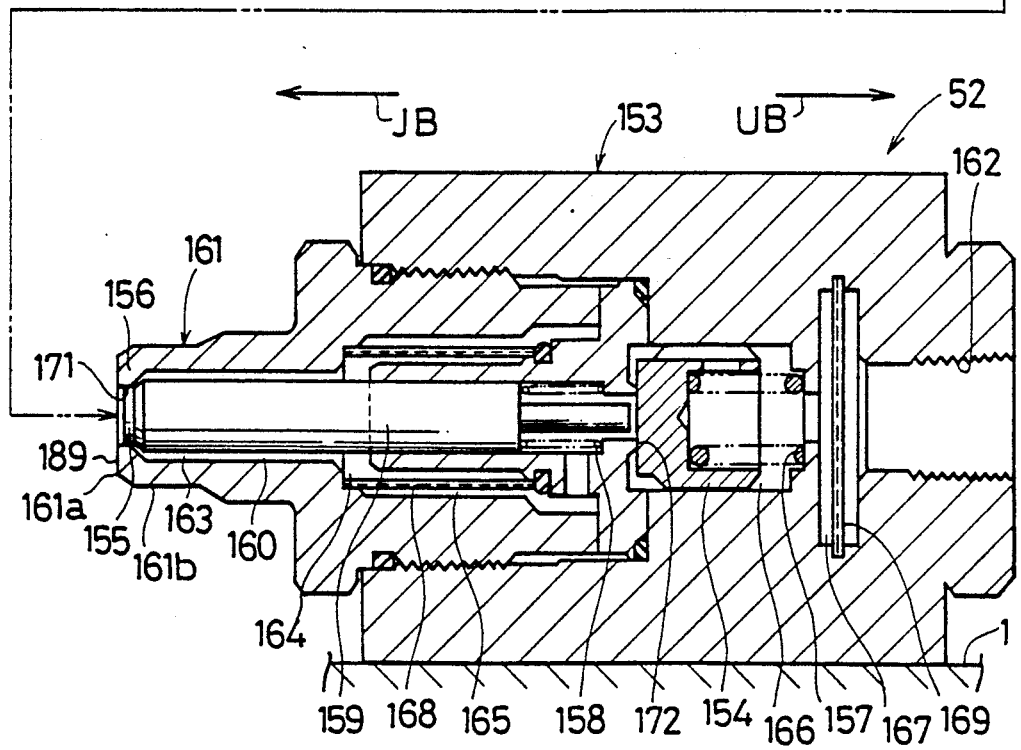

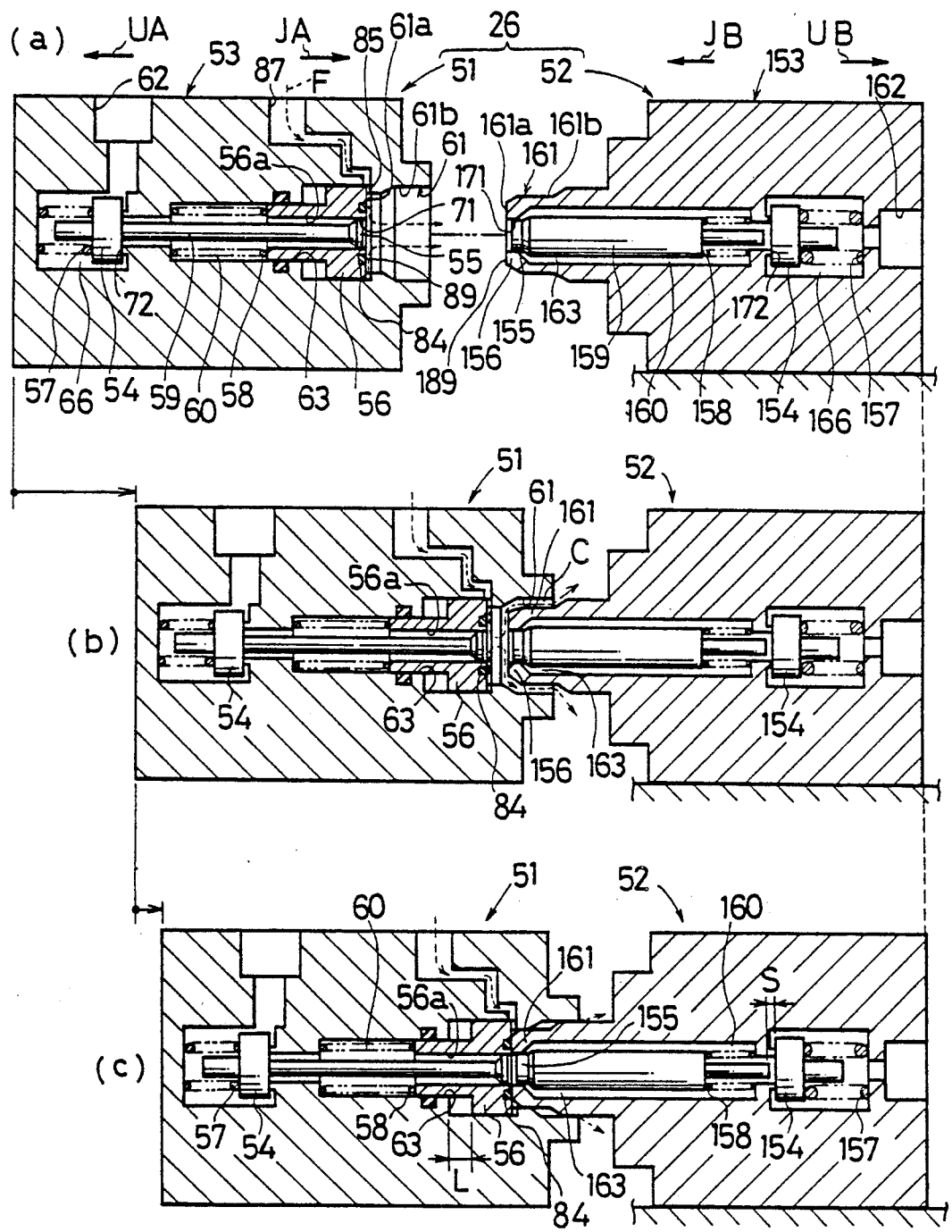
FIG. 7(a)(b)(c)

FIG. 7 (d)(e)(f)
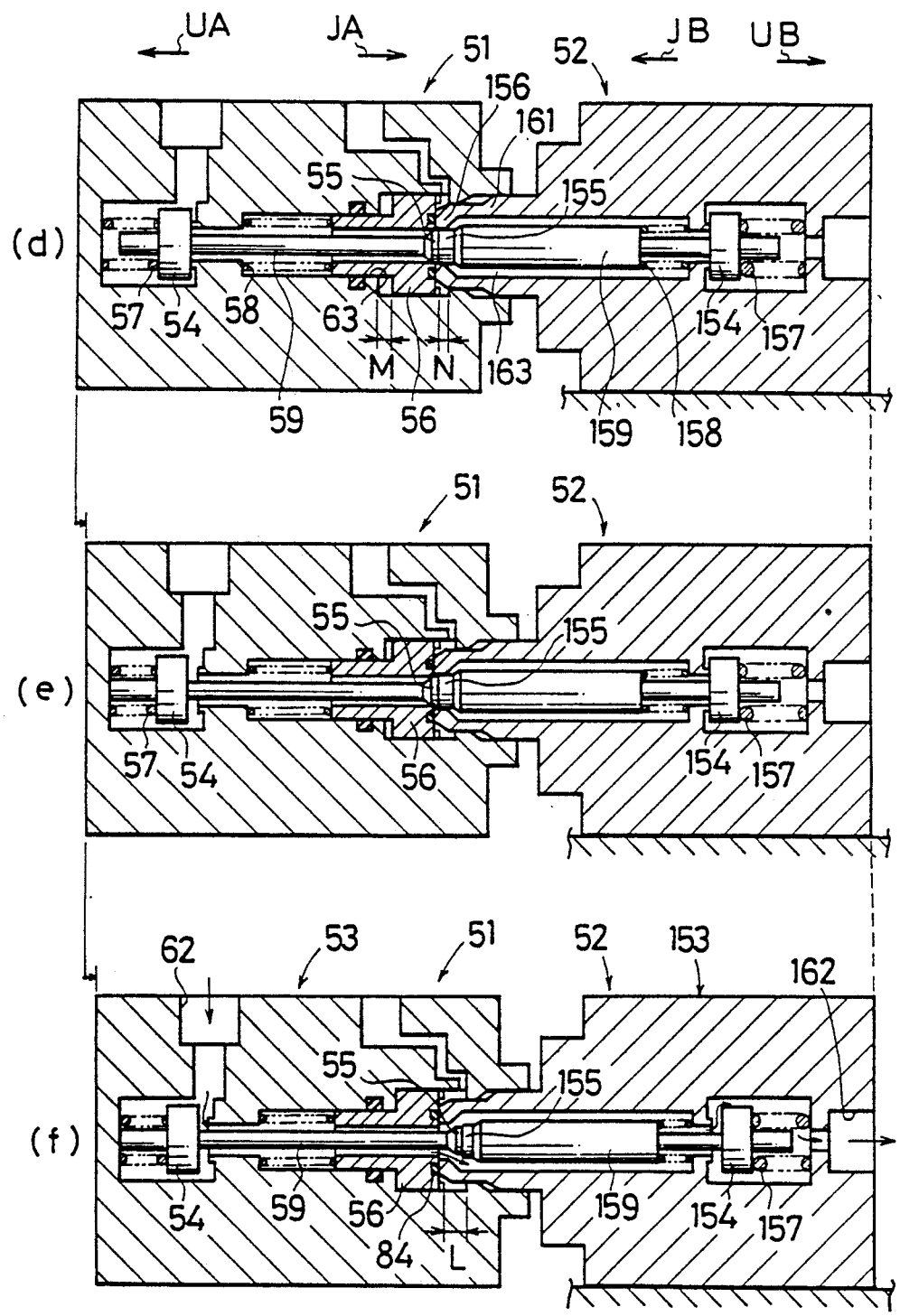

1

QUICK-ACTING COUPLING

This application is a division of application Ser. No. 07/423,276 filed Oct. 18, 1989.

BACKGROUND OF THE INVENTION

1. Field of the Invention

The present invention relates to a quick-acting coupling which is employed for quickly connecting or disconnecting halfway portions of a hydraulic line, for example for use in a hydraulic clamp apparatus for fixing a work in a machine tool.

2. Description of the Prior Art

A quick-acting coupling as a subject of the present invention will be explained more concretely hereinafter. The quick-acting coupling is of the type comprising a pair of couplings provided with check valves and non-spill valves (in other words, spill preventive valves) respectively so that a leak of liquid such as a working oil can be prevented by means of the check valves and a spill of liquid can be prevented by means of the non-spill valves when the couplings are disconnected.

Such a quick-acting coupling with the check valves and the non-spill valves on opposite sides for use in liquid is used for preventing products and atmosphere from being contaminated by the liquid because the coupling is adapted to prevent the spill-out of liquid outside the connection ports during the disconnecting manipulation thereof. Its basic construction known by the inventor of the present invention is shown in FIG. 11 for a first conventional embodiment.

In FIG. 11(a), a quick-acting coupling 26' includes a first coupling 51' and a second coupling 52'.

The first coupling 51' is provided with a coupling body 53', a check valve body 54', a non-spill valve body 55', a non-spill valve casing 56', a check valve spring 57', non-spill valve casing spring 58' and a rod 59'.

The coupling body 53' is provided in its inside with a non-spill valve casing chamber 63' and a check valve chamber 66' in order from the butt connection side JA to the pull-off disconnection side UA. The check valve chamber 66' accommodates the check valve body 54' and the check valve spring 57' therewithin. The non-spill valve casing chamber 63' accommodates the non-spill valve casing 56' therewithin. The non-spill valve body 55' is disposed so as to face the non-spill valve port surface 71' at the leading end of the casing bore 56a' of the non-spill valve casing 56'. The inside of the non-spill valve port surface 71' is in communication to the check valve chamber 66' through the casing bore 56a' of the non-spill valve casing 56', and the non-spill valve body 55' and the check valve body 54' are connected to each other through the rod 59'.

The check valve body 54' is urged toward the butt connection side JA by means of the check valve spring 57' within the check valve chamber 66' so as to be brought into contact with a check valve seat 72' of the check valve chamber 66' for the valve closing. On one hand, the rod 59' transmits the movement of the non-spill valve body 55' toward the pull-off disconnection side UA by an external force to the check valve body 54' so as to shift the check valve body 54' to its valve opening position and on the other hand, it limits the movement of the non-spill valve body 55' toward the butt connection side JA. The non-spill valve casing 56' is adapted to be pushed toward the butt connection side JA by means of the non-spill valve casing spring 58' within the non-spill valve casing chamber 63' so as to bring the non-spill valve port surface 71' into contact with the non-spill valve body 55' for the valve closing.

The second coupling 52' is provided with a coupling body 153', a check valve body 154', a non-spill valve body 155', a check valve spring 157', a non-spill valve spring 158' and a rod 159'.

The coupling body 153' is provided in its inside with a non-spill valve chamber 163' and a check valve chamber 166' in order from a butt connection side JB to a pull-off disconnection side UB, and the non-spill valve chamber 163' is in communication with the check valve chamber 166'. The check valve chamber 166' accommodates the check valve body 154' and the check valve spring 157' therewithin, the non-spill valve chamber 163' accommodates the non-spill valve body 155' therewithin, the non-spill valve body 155' is disposed so as to face a non-spill valve port surface 171' at the leading end of the non-spill valve chamber 163', and the rod 159' is interposed between the non-spill valve body 155' and the check valve body 154'.

The check valve body 154' is urged toward the butt connection side JB by means of the check valve spring 157' within the check valve chamber 166' so as to be brought into contact with a check valve seat 172' of the check valve chamber 166' for the valve closing. The rod 159' transmits the movement of the non-spill valve body 155' toward the pull-off disconnection side UB by an external force to the check valve body 154' so as to shift the check valve body 154' to its valve opening position. On the one hand, the non-spill valve body 155' is adapted to be pushed toward the butt connection side JB by means of the non-spill valve spring 158' within the non-spill valve chamber 163' so as to close the non-spill valve port surface 171' of the non-spill valve chamber 163' and on the other hand, it is adapted to be pushed toward the pull-off disconnection side UB by an external force so as to open the non-spill valve port surface 171'.

In the above-mentioned basic construction, a conventional construction for liquid-tightly sealing the non-spill valve casing chamber 63' and the non-spill valve chamber 163' under the disconnected condition of both the couplings 51', 52' will be explained more in detail hereinafter.

In this prior art, the non-spill valve bodies 55', 155' are of a seat valve type. The first non-spill valve body 55' is adapted to be brought into contact with the tapered non-spill valve port surface 71' from the butt connection side JA to the pull-off disconnection side UA for the valve closing and the second non-spill valve body 155' is adapted to be brought into contact with the tapered non-spill valve port surface 171' from the pull-off disconnection side UB to the butt connection side JB for the valve closing.

The quick-acting coupling 26' for use in liquid having the aforementioned construction operates as follows during the connecting manipulation.

FIG. 11(a) shows the connection starting condition. The respective valve bodies 54', 55', 154', 155' are shifted to the valve closing positions by the springs 57', 58', 157', 158' respectively so as to shut off the communication between both oil supply and discharge ports 62', 162' at the opposite ends. Under this condition, the non-spill valve casing 56' of the first coupling 51' and a valve casing pushing portion 156' of the second coupling 52' are brought into contact with a sealing means 84' for sealing off.

When the first coupling 51' is advanced toward the butt connection side JA on the right side with respect to the second coupling 52', the condition shown in FIG. 11(b) is obtained after the following operations. Firstly, the non-spill valve casing spring 58' is contracted so that the non-spill valve body 55' is separated apart from the non-spill valve port surface 71' and both the valve bodies 55', 155' are butted to each other. Then, the non-spill valve spring 158 is contracted so that the non-spill valve body 155' is separated apart from the non-spill valve port surface 171' and the rod 159' is brought into contact with the check valve body 154'.

Further, as the first coupling 51' is advanced, as shown in FIG. 11(c), firstly the first check valve body 54' is shifted to its valve opening position and then as shown in FIG. 11(d), the second check valve body 154' is shifted to its valve opening position so that both the oil supply and discharge ports 62', 162' are communicated to each other.

On the other hand, the following operations of the quick-acting coupling 26' are carried out during the disconnecting manipulation subsequent to the connection completed condition shown in FIG. 11(d).

When the first coupling 51' is retreated toward the pull-off disconnection side UA on the left side with respect to the second coupling 52', as shown in FIG. 11(c), firstly the second check valve body 154' is shifted to its valve closing position and then as shown in FIG. 11(b), the first check valve body 54' is shifted to its valve closing position. As the first coupling 51' is retreated, the following operations are carried out. That is, as the non-spill valve spring 158' and the non-spill valve casing spring 58' extend, firstly the second rod 159' is separated apart from the check valve body 154' and the second non-spill valve body 155' is brought into contact with the non-spill valve port surface 171' for the valve closing and then the first non-spill valve port surface 71' is brought into contact with the non-spill valve body 55' for the valve closing.

There are, however, following problems associated with the above-mentioned first conventional embodiment.

(a) A spill-out of liquid is caused during the disconnecting manipulation.

Since the quick-acting coupling 26' operates as mentioned above, a time lag can't help being brought about in the valve closing timing of the non-spill valve bodies 55', 155' at the time of disconnecting manipulation of both the couplings 51', 52'.

Further, at the time of connecting manipulation of both the couplings 51', 52', since firstly it is necessary to seal between the non-spill valve casing 56' and the valve casing pushing portion 156' by means of the sealing means 84', a gap can't help being provided between both the butting surfaces of the non-spill valve bodies 55', 155' in order to compensate contact errors between the respective non-spill valve bodies 55', 155' and the respective non-spill valve port surfaces 71', 171'. In other words, just before disconnecting both the couplings 51', 52', a gap is provided between both the butting surfaces of the non-spill valve bodies 55', 155'.

Since there is a time lag in the valve closing timing and there is provided a gap between both the valve bodies in that way, a liquid pool is formed between both the non-spill valve bodies 55', 155' just before their disconnections. Further, the quantity of this liquid pool can't help become larger owing to a gap provided by chamfers formed at the peripheral portions of both the valve bodies 55', 155'. Resultantly, the spill-out of liquid is caused at the time of disconnecting manipulation.

(b) The durability for the spill prevention is low.

Since the non-spill valve bodies 55', 155' of the seat valve type and the non-spill valve port surfaces 71', 171' are apt to be damaged by foreign substances and the like bitten therebetween, the liquid-tight sealing is readily broken. Therefore, the durability for the spill prevention is low.

(c) A large force is required for the connecting manipulation.

Since the non-spill valve bodies 55', 155' are shifted to the valve closing positions with the non-spill valve casing chamber 63' and the non-spill valve chamber 163' being kept under high pressure conditions at the time of disconnecting manipulation of both the couplings 51', 52', a large manipulation force is required for the connecting manipulation at the next time.

Further, has been known another quick-acting coupling having a different basic construction from the above-mentioned first conventional embodiment and provided with a cleaning device of a fluid blow type. This coupling is adapted to remove foreign substances attached to connecting portions of a pair of couplings of a quick-acting coupling by means of the blow employing a cleaning fluid such as a pressure air and the like so as to clean the connecting portions when the pair of couplings is connected.

As such a quick-acting coupling with the cleaning device, has been known the one disclosed in Japanese Provisional Utility Model No. 1985-52496 (referred to as a second conventional embodiment, hereinafter) previously proposed by the inventer of the present invention. This coupling is constructed as follows, as shown in FIG. 12.

A connecting insert portion 161" is formed at the leading end portion of a coupling body 153" of a second coupling 52". A flow passage 160" on a second coupling side is opened in the leading end surface 161a" of the connecting insert portion 161", and an annular sealing contact portion 189" is formed in the connecting insert portion 161" at the central portion in the right and left direction of an outer surrounding surface 161b" thereof 161".

A connecting receive mouth 61" is formed in the leading end portion of a coupling body 53" of a first coupling 51" in a concaved fashion. A flow passage 60" on a first coupling side is opened in the inmost end surface 61a" of the connecting receive mouth 61", and an annular sealing contact portion 89" is provided in the connecting receive mouth 61" at the central portion in the right and left direction of an inner surrounding surface 61b" thereof 61". A plurality of ejection holes 85" are opened in the inner surrounding surface 61b" of the connecting receive mouth 61" at the leading end portion in a forward inclined manner so as to eject a cleaning fluid F. Under the midway condition of the connection between the first coupling 51" and the second coupling 52" as shown in FIG. 12(a), the cleaning fluid F ejected from the ejection holes 85" is sprayed to both the leading end surface 161a" and the outer surrounding surface 161b" of the insert portion 161" to clean these portions.

Under the connected condition between the first coupling 51" and the second coupling 52" as shown in FIG. 12(b), both the sealing contact portions 89", 189" are brought into contact with each other so as to seal between both the connection surfaces of the connecting receive mouth 61" and of the connecting insert portion 161".

Further, the aforementioned second conventional embodiment is also provided with ejection holes 85a" opened in the inner surrounding surface 61b" of the receive mouth 61" at the inmost portion as a variant of the ejection hole 85" for ejecting the cleaning fluid F as shown by the alternate long and two short dashes line in FIG. 12(a).

There are, however, the following problems (1) and (2) associated with the second conventional embodiment in addition to such a problem that a spill quantity of liquid from the first coupling 51" is large at the time of disconnection between both the couplings 51", 52" because a large liquid pool is provided in the inmost portion of the connecting receive mouth 61" behind the sealing contact portion 89" when both the couplings 51", 52" are disconnected.

(1) In the case of the ejection hole 85" (refer to the one shown by the solid line in FIG. 12(a)):

At the time of disconnecting manipulation of the quick-acting coupling 26", foreign substances attached to both the leading end surface 161a" and the outer surrounding surface 161b" of the connecting insert portion 161" of the second coupling 52" can be preferably removed therefrom 161a", 161b" by spraying the cleaning fluid F thereto 161a", 161b".

But, is impossible to spray the cleaning fluid F to the inner surrounding surface 61b" and to the inmost end surface 61a" of the first coupling 51". Therefore, the foreign substances attached thereto 61a", 61b" are bitten between both the connecting surfaces of the sealing contact portion 89", 189" to cause damages thereof and/or enter the flow passage 60" on the first coupling side or the flow passage 160" on the second coupling side.

(2) In the case of the ejection hole 85a"(refer to the one shown by the alternate long and two short dashes line in FIG. 12(a)):

In this case, though it is possible to make the cleaning fluid F pass through the connecting receive mouth 61", it is impossible to spray the fluid F to the inmost end surface 61a" and it is also impossible to spray the fluid F strongly to the inner surrounding surface 61b".

Further, when the connecting insert portion 161" is started to fit into the connecting receive mouth 61", since the receive mouth 61" is closed and subsequently the flowing of the cleaning fluid F is stopped, it becomes impossible to clean the outer surrounding surface 161b" of the connecting insert portion 161".

SUMMARY OF THE INVENTION

The first object of the present invention is to prevent a spill of liquid at the time of disconnecting manipulation of a quick-acting coupling, to enhance the durability for such a spill prevention and to enable to make the connecting manipulation force small.

The second object of the present invention is to prevent foreign substances from being bitten between sealing contact portions and from entering flow passages at the time of connecting manipulation of the quick-acting coupling.

For accomplishing the above first object, the partial construction for liquid-tightly sealing the non-spill valve casing chamber and the non-spill valve chamber under the disconnected conditions of both the couplings in the basic construction of the above-mentioned first conventional embodiment is improved as follows, for example as shown in FIGS. 4 through 7.

The respective non-spill valve port surfaces (71), (171) are formed like the casing bore inside circumferential surfaces. The respective non-spill valve bodies (55), (155) are fitted slidably inside the non-spill valve port surfaces (71), (171) configurating with the casing bore inside circumferential surfaces so as to liquid-tightly seal the casing bore (56a) of the non-spill valve casing chamber (63) and the non-spill valve chamber (163).

Both the front side spaces and the back side spaces of the respective non-spill valve bodies (55), (155) are connected to each other through connection passages (75), (175) having small cross-sectional areas under the valve closed conditions of the respective non-spill valve bodies (55), (155). During the disconnecting transitive stage wherein the first coupling (51) and the second coupling (52) are changed over from their butted connected condition to their pulled-off disconnected condition, the total operation lift (L) of the non-spill valve casing (56) provided by means of the non-spill valve casing spring (58) toward the butt connection side (JA) is set larger by the value corresponding to a sucking back lift (N) than an all valve closing minimum lift (M) of the non-spill valve casing (56) required in minimum for completing the valve closings of all the check valve bodies (54), (154) and the non-spill valve bodies (55), (155).

In the aforementioned construction, the casing bore inside circumferential surfaces of the non-spill valve port surfaces (71), (171) may be formed in a circular or polygonal configuration.

Further, the connection passages (75), (175) may be formed by gaps provided by the fitting of the respective non-spill valve port surfaces (71), (171) and the respective spill preventive valve bodies (55), (155) or by connection ports passing through the respective non-spill valve bodies (55), (155).

Further more, the check valve body (54), the rod (59) and the non-spill valve body (55) in the first coupling (51) may be formed in three manners, namely separately, integratedly with the adjacent ones to each other and wholly as one piece.

Similarly, the check valve body (154), the rod (159) and the non-spill valve body (155) in the second coupling (52) may be formed in three manners, namely separately, integratedly with the adjacent ones to each other and wholly as one piece. In the case of the integration of the check valve body (154) and the rod (159), the non-spill valve spring (158) may be omitted by substituting the check valve spring (157) for the non-spill valve spring (158).

Incidentally, as the external force for the connecting manipulation of both the couplings (51), (52), the operation force of an actuator such as a pneumatic cylinder and the like or a man power of a worker may be used.

The invention functions as follow, for example as shown in FIG. 7.

The quick-acting coupling (26) operates as follows at the time of connecting manipulation. During the duration from the disconnected condition shown in FIG. 7(a) to the connection starting condition shown in FIG. 7(c) via the inserting condition shown in FIG. 7(b), the respective valve bodies (54), (55), (154), (155) are kept in the valve closed conditions. Subsequently, during the duration for changing over to the connected condition shown in FIG. 7(f) via the connection transitive conditions shown in FIGS. 7(d) and 7(e), the respective valve bodies (54), (55), (154), (155) are shifted to the valve open positions so as to communicate both the liquid supply and discharge ports (62), (162) to each other.

On one hand, the coupling (26) operates as follows at the time of disconnecting manipulation. During the duration from the connected condition shown in FIG. 7(f) to the condition shown in FIG. 7(d) via the condition shown in FIG. 7(e), the check valve bodies (54), (154) are shifted to the valve closed positions so that the non-spill valve casing chamber (63) and the non-spill valve chamber (163) are shut out from the liquid supply and discharge ports (62), (162). During the duration from the condition shown in FIG. 7(d) to the condition shown in FIG. 7(c), as the non-spill valve casing (56) is advanced toward the butt connection side (JA) by the sucking back lift (N) with respect to the coupling body (53), the liquid phase volume within the non-spill valve casing chamber (63) is increased so as to lower the pressures within the casing bore (56a) of the non-spill valve casing (56) and the non-spill valve chamber (163) communicating to each other to a pressure level near a negative pressure. Therefore, the liquid pooled in the gap between both the non-spill valve bodies (55), (155) butting to each other and the inside circumferential space of the sealing means (84) is sucked backed into the casing bore (56a) of the non-spill valve casing (56) and the non-spill valve chamber (163) by means of the effect of the atmospheric pressure so as to liquid-tightly seal both the chambers (63), (163) under this condition. Accordingly, none of liquid leaks during the disconnecting manipulation from the condition shown in FIG. 7(c) to the condition shown in FIG. 7(b).

Since it becomes possible to liquid-tightly seal the non-spill valve casing chamber (63) and the non-spill valve chamber (163) by merely fitting the non-spill valve bodies (55), (155) inside the non-spill valve port surfaces (71), (171), the valve bodies (55), (155) and the port surfaces (71), (171) are not damaged by the biting of foreign substances differently from the conventional seat valve type one so that the durability for the spill prevention can be enhanced.

Further, since the pressure within the non-spill valve casing chamber (63) and the non-spill valve chamber (163) are lowered nearly to the atmospheric pressure at the time of disconnecting manipulation of both the couplings (51), (52), the manipulation force required for the next connecting manipulation can be made smaller.

Incidentally, in the case that the non-spill valve body (155) and the rod (159) of the second coupling (52) are formed separately from the check valve body (154) as illustrated, the spill preventive effect may be further improved. That is, during the duration from the condition shown in FIG. 7(d) to the condition shown in FIG. 7(c), as the non-spill valve body (155) and the rod (159) are advanced toward the butt connection side (JB) by the lift (S) with respect to the coupling body (153), the liquid phase volume within the non-spill valve chamber (163) is increased so that the pressures within the casing bore (56a) of the non-spill valve casing (56) and the non-spill valve chamber (163) communicating to each other can be further lowered.

Since the present invention is constructed and functions as mentioned above, the following advantages can be provided.

(a) A leak of liquid can be prevented at the time of disconnecting manipulation.

By lowering the pressures within the casing bore of the non-spill valve casing and the non-spill valve chamber communicating to each other to a pressure level near to a negative pressure as the non-spill valve casing advances to the butt connection side by the sucking back lift with respect to the first coupling body at the end of the disconnecting manipulation of both the couplings, the liquid pooled within the gap between both the non-spill valve bodies butting each other and within the inside circumferential space of the sealing means is sucked back into the non-spill valve casing chamber and the non-spill valve chamber so as to liquid-tightly seal both the chambers under this condition. Therefore, a leak of working oil can be prevented completely.

(b) The durability for the spill prevention is high.

Since the non-spill valve casing chamber and the non-spill valve chamber are liquid-tightly sealed by the fitting between the non-spill valve bodies and the non-spill valve port surfaces, they don't suffer from damages which might be caused by the bitings of foreign substances therebetween. Therefore, the durability for the spill prevention can be enhanced.

(c) A small force can be enough for the connecting manipulation.

Since the pressures within the non-spill valve casing chamber and within the non-spill valve chamber are lowered nearly to the atmospheric pressure at the time of disconnecting manipulation of both the couplings, a small force is required for the connecting manipulation at the next time.

For accomplishing the above second object of the present invention, the partial portion for blowing off the foreign substances by means of the cleaning fluid is improved as follows, for example as shown in FIGS. 4 through 7.

A sealing contact portion (89) of the first coupling (51) is disposed in an inmost end surface (61a) of a connecting receive mouth (61), and a sealing contact portion (189) of the second coupling (52) is disposed in a leading end surface (161a) of a connecting insert portion (161). An ejection hole (85) for the cleaning fluid (F) is opened in the inner surrounding surface (61b) of the connecting receive mouth (61) at the inmost portion, and the axis of the ejection hole (85) is oriented in such a direction as to spray the cleaning liquid (F) to the inmost end surface (61a) and the sealing contact portion (89) of the receive mouth (61). On the midway of the connection between the first coupling (51) and the second coupling (52), a cleaning flow passage (C) is provided along the whole length between the fitting surrounding surfaces of the connecting receive mouth (61) and the connecting insert portion (161) as shown in FIG. 7(b).

The present invention functions as follows, as shown in FIGS. 7(a) through 7(c).

When the connection of the quick-acting coupling (26) is started, as shown in FIG. 7(a), the cleaning fluid (F) is adapted to be ejected forward from the central portion of the connecting receive mouth (61) after flowing centripetally from the respective ejection holes (85) of the first coupling (51) and then blowing off the foreign substances attached to the inmost end surface (61a) and the sealing contact portion (89) of the receive mouth (61).

When the engagement between the connecting receive mouth (61) and the connecting insert portion (161) is started, as shown in FIG. 7(b), the cleaning fluid (F) flows centrifugally along the leading end surface (161a)

of the connecting insert portion (161) to blow off the foreign substances therefrom and then flows forward through the cleaning flow passage (C) to blow off the foreign substances attached to the inner surrounding surface (61b) of the receive mouth (61) and the outer surrounding surface (161b) of the insert portion (161). Then, as shown in FIG. 7(c), both the sealing contact portions (89), (189) are brought into contact with each other, and a first coupling side flow passage (60) and a second coupling side flow passage (160) are communicated to each other under the sealed condition.

Since all the inmost end surface and the inner surrounding surface of the connecting receive mouth as well as the leading end surface and the outer surrounding surface of the connecting insert portion can be cleaned in that way, the bitings of the foreign substances between both the sealing contact portions can be prevented as well as the entering of the foreign substances into the first coupling side flow passage and the second coupling side flow passage can be also prevented.

Those and still other objects and advantages will be apparent from the following description of the embodiment and its modifications of the present invention when taken in conjunction with the attached drawings.

BRIEF DESCRIPTION OF THE DRAWINGS

FIGS. 1 through 10 show embodiments of the present invention.

FIGS. 1 through 7 show a first embodiment thereof.

FIG. 1 is a diagram showing a whole system of a hydraulic clamp apparatus;

FIG. 2 is a plan view showing a pressure oil supply and discharge coupling means;

FIG. 3 is a front view showing the above coupling means;

FIG. 4 is a vertical sectional view showing the disconnected condition of the quick-acting coupling;

FIG. 5 is a sectional view on V—V directed line in FIG. 4;

FIG. 6 is an enlarged view showing a principal part of the quick-acting coupling under the connected condition thereof;

FIG. 7 is an explanatory view of the operations of the quick-acting coupling, FIG. 7(a) is a view showing the disconnected condition thereof, FIGS. 7(b) through 7(e) are views showing the connection transitive conditions thereof, and FIG. 7(f) is a view showing the connected condition thereof;

FIG. 8 is a view showing a second embodiment corresponding to FIG. 4;

FIG. 9 is a vertical sectional view showing a socket (a first coupling) in a third embodiment; and FIG. 10 is a vertical sectional view showing a plug (a second coupling) in a fourth embodiment.

FIG. 11 is an explanatory view of the operations of a quick-acting coupling of a first conventional embodiment, FIG. 11(a) is a view showing the connection starting condition thereof, FIGS. 11(b) and 11(c) are views showing the connection transitive conditions thereof, and FIG. 11(d) is a view showing the connection completed condition thereof; and FIG. 12 is an explanatory view of the operations of a quick-acting coupling of a second conventional embodiment, FIG. 12(a) is a view showing the disconnected condition thereof, and FIG. 12(b) is a view showing the connected condition thereof.

DESCRIPTION OF THE PREFERRED EMBODIMENTS

Now, the embodiments of the present invention will be explained with reference to the drawings hereinafter.

First Embodiment

FIGS. 1 through 7 show the first embodiment thereof.

Figure 1:
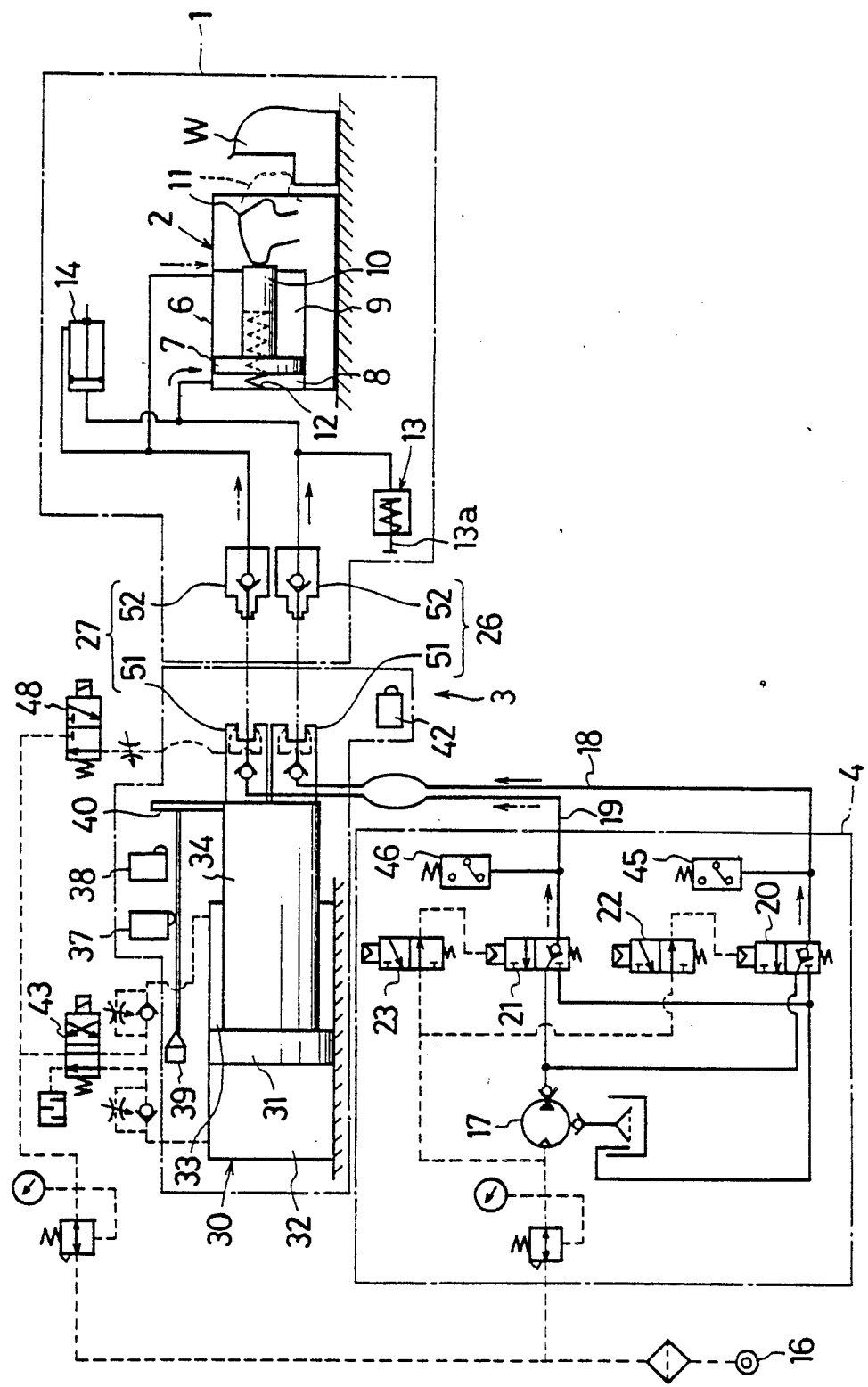
Figure 5:
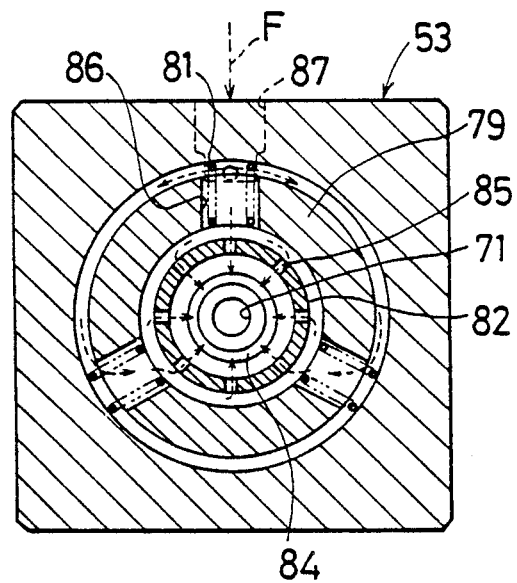

FIG. 1 shows a diagram of a whole system of such an apparatus as to supply and discharge a pressure oil by means of a pressure oil supply and discharge means 4 through a pressure oil supply and discharge coupling means 3 relative to a hydraulic clamp 2 provided in a work palette 1 for use in a machining center.

A work W and a plurality of hydraulic clamps 2 are mounted on the upper surface of the work palette 1. The respective hydraulic clamps 2 are constructed as follows.

When the work W is clamped, the work palette 1 and the pressure oil supply and discharge means 4 are connected to each other by means of the coupling means 3 so that the pressure oil is supplied to a clamp actuating oil chamber 8 formed on the left side of a piston 7 within a double-acting hydraulic cylinder 6 and the pressure oil is discharged from an unclamp actuating oil chamber 9 formed on the right side of the piston 7. Thereupon, the piston 7 and its piston rod 10 are advanced to the right side, and the clamp arm 11 is shifted to its clamping position indicated by the broken line in FIG. 1 through the piston rod 10. While this clamped condition is maintained, the work palette 1 is disconnected from the pressure oil supply and discharge means 4 and then the work palette 1 is carried to the machining center (not illustrated) in order to apply a machining to the work W. Incidentally, symbol 12 designates a clamped condition holding spring.

On the other hand, when the work W is unclamped, the work palette 1 and the pressure oil supply and discharge means 4 are connected to each other again by means of the coupling means 3 so that the pressure oil is supplied to the unclamp actuating oil chamber 9 and the pressure oil is discharged from the clamp actuating oil chamber 8. Thereupon, the piston 7 and the piston rod 10 are retreated to the left side against the clamped condition holding spring 12, and the clamp arm 11 is shifted to its unclamping position indicated by the solid line synchronously with the retreating movement of the piston rod 10.

Incidentally, the work palette 1 is provided with a reserving cylinder 13 for holding a clamping pressure and a balance cylinder 14.

Then, the pressure oil supply and discharge means 4 will be explained. It is provided with a booster pump 17 which is actuated by a pressurized air supplied from a pneumatic source 16 so as to deliver a pressure oil. A clamp actuating changeover valve 20 is disposed in a clamp actuating oil passage 18, and an unclamp actuating changeover valve 21 is disposed in an unclamp actuating oil passage 19. Both oil passages 18, 19 are extended from a delivery port of the booster pump 17. The hydraulic clamp 2 is actuated for the clamping through the coupling means 3 by changing over the clamp actuating changeover valve 20 to its supply position and by changing over the unclamp actuating changeover valve 21 to its discharge position. To the contrary, by changing over the unclamp actuating changeover valve 21 to its supply position and by changing over the clamp actuating changeover valve 20 to its discharge position, the hydraulic clamp 2 is actuated for the unclamping through the coupling means 3. The changeover manipulations for the respective changeover valves 20, 21 are carried out by means of pilot valves 22, 23 respectively.

Then, the coupling means 3 will be explained. It is provided with two quick disconnect couplings of the clamp actuating quick-acting coupling 26 and an unclamp actuating quick-acting coupling 27, each of which 26, 27 comprises the quick-acting coupling with check valves and non-spill valves on opposite sides for use in liquid. The clamp actuating oil chamber 8 of the hydraulic clamp 2 and the clamp actuating oil passage 18 of the pressure oil supply and discharge means 4 are connected or disconnected by means of the clamp actuating quick-acting coupling 26. The unclamp actuating oil chamber 9 of the hydraulic clamp 2 and the unclamp actuating oil passage 19 of the pressure oil supply and discharge means 4 are connected or disconnected by means of the unclamp actuating quick-acting coupling 27. The construction and the operation of the coupling means 3 will be explained with reference to the system diagram of FIG. 1, a plan view of FIG. 2 and a front view of FIG. 3 hereinafter.

A pneumatic cylinder 30 is fixedly secured to the upper surface of a coupling fixing pedestal P so that the work palette 1 can be carried to a predetermined position on the right side thereof and fixedly secured thereat. An advancement pneumatic actuation chamber 32 is formed on the left side of a piston 31 within a pneumatic cylinder 30, and a retreat pneumatic actuation chamber 33 is formed on the right side thereof. Sockets 51, 51 as one side couplings (first couplings) composing the respective quick-acting couplings 26, 27 are fixed through a mounting bracket 35 to the leading end of a piston rod 34 projecting toward the right side from the piston 31. Corresponding thereto, plugs 52, 52 as the other side couplings (second couplings) composing the respective quick-acting couplings 26, 27 are fixed to the left portion of the work palette 1. An advancement detecting limit switch 37 and a retreat detecting limit switch 38 are fixed side by side on the pneumatic cylinder 30. These limit switches 37, 38 are adapted to be operably pushed respectively by means of an advancement detecting actuation rod 39 and a retreat detecting actuation rod 40 projecting to the left side from the bracket 35. A clamp pressure detecting limit switch 42 is fixed to the lateral side of the sockets 51, 51 corresponding to the piston rod 13a of the reserving cylinder 13 fixed to the left portion of the work palette 1.

The above coupling means 3 operates as follows.

Under the unclamped disconnected condition shown in the drawing, when a clamp manipulation switch (not illustrated) is turned on, firstly a pressurized air is supplied into the advancement pneumatic actuation chamber 32 through a pneumatic changeover valve 43 so that the piston 31 and the piston rod 34 can be advanced to the right side. Synchronously therewith, the sockets 51, 51 are advanced to the right side so as to be connected to the plugs 52, 52. Thereupon, the advancement detecting actuation rod 39 pushes and operates the advancement detecting limit switch 37 so as to change over the clamp actuation changeover valve 20 to its pressure supply position through the pilot valves 22, 23 as well as to change over the unclamp actuation changeover valve 21 to its discharge position therethrough 22, 23 in order to extend the hydraulic cylinder 6 of the hydraulic clamp 2. When the hydraulic clamp 6 is extended sufficiently so that the work W can be clamped, the pressure within the pressure switch 45 disposed in the clamp actuation oil passage 18 is increased to a predetermined clamp pressure and a piston rod 13a of a reserving cylinder 13 is extended so as to push and operate a clamp pressure detecting limit switch 42.

Then, after the lapse of a predetermined time, the pneumatic changeover valve 43 is changed over so that the pressurized air is supplied to the retreat pneumatic actuation chamber 33 and the sockets 51, 51 can be retreated to the left side through the piston 31 and the piston rod 34. Thereby, the hydraulic clamp 2 is disconnected under the clamped condition. Simultaneously therewith, the retreat detecting limit switch 38 is pushed and operated by means of the retreat detecting actuation rod 40 to detect the completion of the disconnection.

Incidentally, in the above operations, for the duration from the turning-on of the clamp actuation switch (not illustrated) to the operation of the advancement detecting limit switch 37, the pressurized air of the pneumatic source 16 is supplied from a pneumatic changeover valve 48 for airblowing to the respective sockets 51, 51. Accordingly, since foreign substances attached to the leading end portions of the respective sockets 51, 51 and of the respective plugs 52, 52 are blown off, the connection between the socket 51 and the plug 52 is carried out smoothly.

To the contrary, in the case that the hydraulic clamp 2 is changed over from the above-mentioned clamped condition to the unclamped condition, when an unclamp actuation switch (not illustrated) is turned on, the respective sockets 51, 51 and the respective plugs 52, 52 are connected to each other similarly as mentioned above. Thereupon, the advancement detecting limit switch 37 is actuated so that the pressure oil can be supplied to the unclamp actuation oil chamber 9 of the hydraulic clamp 2 through the unclamp actuation changeover valve 21 and the pressure oil within the clamp actuation oil chamber 8 can be discharged through the clamp actuation changeover valve 20. Accordingly, a pressure switch 46 of the unclamp actuation oil passage 19 detects a pressure lowering and the clamp pressure detecting limit switch 42 is released from its actuation. After the lapse of a predetermined time from that time, the pressurized air is supplied to the retreat pneumatic actuation chamber 33 through the pneumatic changeover valve 43 so that the sockets 51, 51 can be retreated to the left side. Thereby the hydraulic clamp 2 is disconnected under the unclamped condition. Simultaneously therewith, the retreat detecting actuation rod 40 pushes and actuates the retreat detecting limit switch 38 so as to detect the completion of the disconnected condition.

In the coupling means 3 having the above-mentioned construction, two quick-acting couplings 26, 27 are constructed similarly. The concrete construction thereof will be explained with reference to FIGS. 4 through 7 and FIG. 1.

Firstly, the socket 51 will be explained with reference to FIG. 4. Within the body 53 as the coupling body there are provided a connecting receive mouth 61, a socket side flow passage 60 as a first coupling side flow passage and an oil supply and discharge port 62 in order from the butt connection side (on the right side in FIG. 4) JA to the pull-off disconnection side (on the left side therein ) UA. Within the socket side flow passage 60 there are provided a check valve body 54, a non-spill valve body 55, a non-spill valve casing 56, a check valve spring 57, a non-spill valve casing spring 58 and a rod 59.

That is, the receive mouth 61 is formed by concaving the central portion of the socket body 53 on the butt connection side JA, and the socket side flow passage 60 is opened in the inmost end surface 61a of the receive mouth 61. Within the socket side flow passage 60 there are provided a non-spill valve casing chamber 63, a rod chamber 64, a first annular filter chamber 65 formed outside the rod chamber 64, a check valve chamber 66 and a second filter chamber 67. A cylindrical filter 68 is accommodated within the first filter chamber 65, and a disk-like filter 69 is accommodated within the second filter chamber 67. The check valve body 54 and the check valve spring 57 are accommodated within the check valve chamber 66. Further, the non-spill valve casing 56 is accommodated within the non-spill valve casing chamber 63.

A cylindrical non-spill valve port surface 71 is formed in the leading end portion of the casing bore 56a of the nonspill valve casing 56, and the non-spill valve body 55 is fitted slidably inside the non-spill valve port surface 71. The inside of the non-spill valve port surface 71 is communicated with the check valve chamber 66 through the casing bore 56a of the non-spill valve casing 56, the rod chamber 64 and the cylindrical filter 68.

Further, the non-spill valve body 55 is connected to the check valve body 54 through the rod 59. The check valve body 54 is urged toward the butt connection side JA on the right side by means of the check valve spring 57 within the check valve chamber 66 so as to be butted on the check valve seat 72 of the check valve chamber 66 for the valve closing. The rod 59 is separated into two portions of a front rod 73 and a back rod 74. The non-spill valve body 55 is integrated with the leading end of the front rod 73. On one hand, these rods 73, 74 transmit the movement of the non-spill valve body 55 toward the pull-off disconnection side ( the left side ) UA by an external force to the check valve body 54 so as to shift the check valve body 54 to its valve opening position. On the other hand, the front rod 73 limits the movement of the non-spill valve body 55 toward the butt connection side ( the right side ) JA by means of its engaging portion 73a. Incidentally, though the rod 59 is divided into two pieces in order to facilitate the assembly of the quick-acting coupling 26, it may be also possible to limit the movement of the non-spill valve body 55 toward the butt connection side JA by means of the check valve seat 72 after the respective component parts of those non-spill valve body 55, front rod 73, back rod 74 and check valve body 54 are integrated as one piece.

The non-spill valve casing 56 is urged toward the butt connection side JA on the right side by means of the nonspill valve casing spring 58 within the non-spill valve casing chamber 63 so that the non-spill valve port surface 71 can be closed by means of the non-spill valve body 55. Under the valve closed condition of the non-spill valve body 55, the front side space and the back side space thereof are communicated to each other through a fitting gap ( a communication passage ) 75 having a small cross-sectional area ( refer to FIG. 6 ). However, since the fitting gap 75 is very small, the non-spill valve casing chamber 63 is blocked liquidly by means of surface tension of the working oil.

Further, a butt connection alignment device 77 is provided in the socket 51.

That is, an eccentricity allowing casing 78 is fitted in the socket body 53 on the butt connection side JA so as to be radially movable under the liquid-tight condition. The eccentricity allowing casing 78 comprises a connecting mouthpiece casing 79 having the connecting receive mouth 61 and a guide cylinder 80 fitted therein. The guide cylinder 80 is centrally held by means of a plurality of positioning springs 81. The non-spill valve casing 56 is accommodated within the bore of the guide cylinder 80 so as to be movable in a fore and rear direction under the liquid-tight condition. A declination allowing ring 82 is externally fitted to the leading end portion of the non-spill valve casing 56 so as to be swingable declinationally. A sealing means 84 composed of an O-ring is fitted between the declination allowing ring 82 and the non-spill valve casing 56. A sealing contact portion 89 is formed in the leading end surface of the sealing means 84. Under the butted connected condition ( refer to FIG. 6 ), the valve casing pushing portion 156 provided at the leading end of the plug 52 is adapted to push the non-spill valve casing 56 toward the pull-off disconnection side UA on the left side through the declination allowing ring 82.

Further, the inner surrounding surface 61b of the connecting receive mouth 61 is provided at a plurality of locations in its circumferential direction with ejection holes 85 for ejecting a pressurized air F as a cleaning fluid. That is, these ejection holes 85 are formed in the leading end surface of the declination allowing ring 82 disposed at the inmost portion of the inner surrounding surface 61b of the receive mouth 61. The axes of the respective ejection holes 85 are oriented in such a direction as to spray the pressurized air F onto the inmost end surface 61a of the receive mouth 61 and the sealing contact portion 89. The respective ejection holes 85 are communicated with an air supply port 87 for an air blowing through a plurality of communication holes 86 formed in the connecting mouthpiece casing 79. The positioning spring 81 is accommodated within each of the communication holes 86.

Then, the plug 52 will be explained hereinafter.

The plug 52 has a plug body 153 as a coupling body provided with a connecting insert portion 161, a plug side flow passage 160 as a second coupling side flow passage and an oil supply and discharge port 162 arranged from the butt connection side ( the left side in the drawings ) JB to the pull-off disconnection side ( the right side therein ) UB thereof. Within the plug side flow passage 160 there are provided a check valve body 154, a non-spill valve body 155, a check valve spring 157, a non-spill valve spring 158 and a rod 159.

Figure 6:
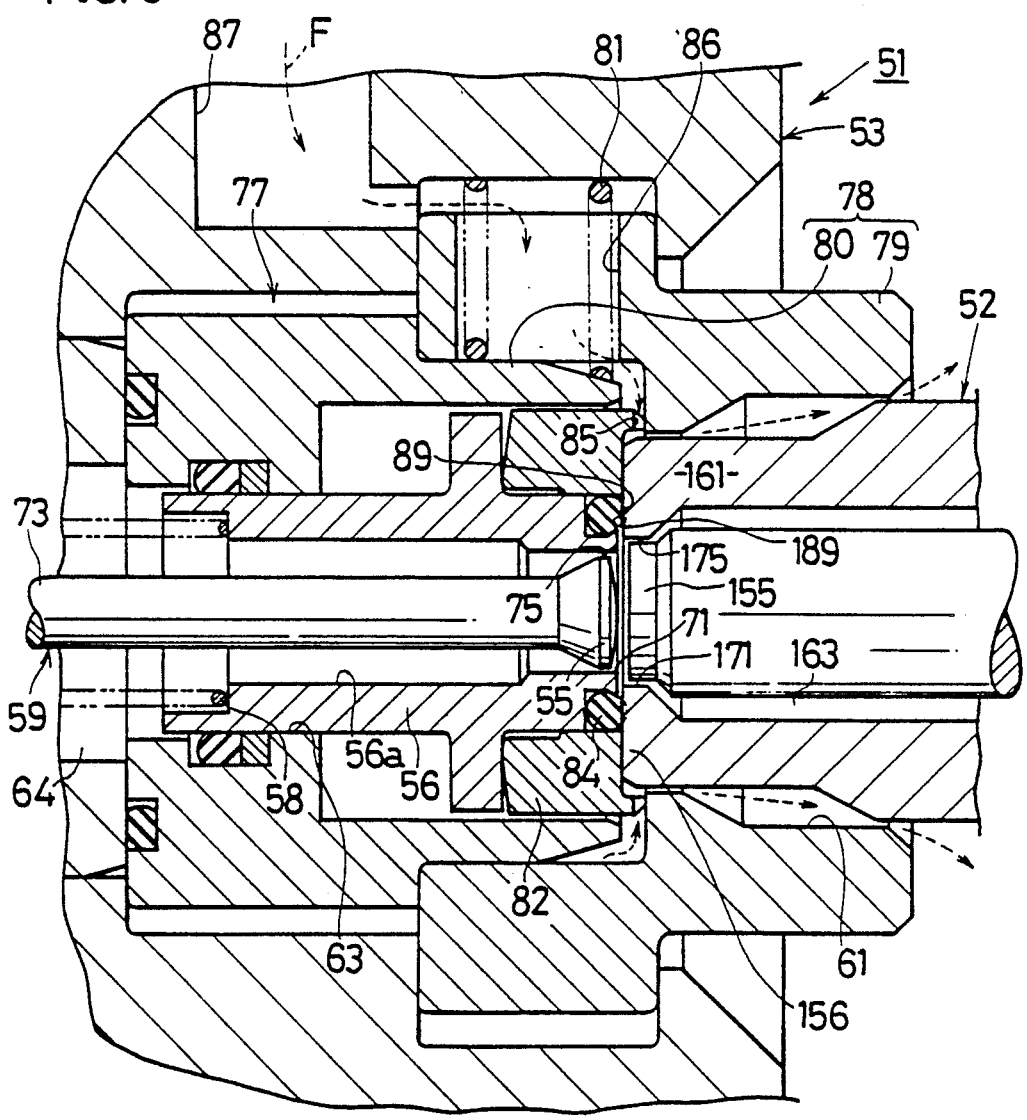

That is, the plug side flow passage 160 is opened in the leading end surface 161a of the connecting insert portion 161, and annular sealing contact portion 189 is formed therein 161a corresponding to the sealing contact portion 89 of the socket 51. As shown in FIG. 6, both the sealing contact portions 89, 189 are kept in contact with each other so as to seal a space between both the fitting surfaces of the connecting receive mouth 61 and the connecting insert portion 161 under the connected condition of both the socket 51 and the plug 52.

Within the plug side flow passage 160 there are provided the non-spill valve chamber 163, the rod chamber 164, an annular first filter chamber 165, a check valve chamber 166 and a second filter chamber 167. A cylindrical filter 168 is accommodated within the first filter chamber 165, and the non-spill valve chamber 163 is communicated with the check valve chamber 166 through the cylindrical filter 168. A disk-like filter 169 is accommodated within the second filter chamber 167.

The check valve body 154 and the check valve spring 157 are accommodated within the check valve chamber 166, and the non-spill valve body 155 is accommodated within the non-spill valve chamber 163. The cylindrical non-spill valve port surface 171 is formed in the leading end portion of the non-spill valve chamber 163, and the non-spill valve body 155 is internally fitted slidably to the non-spill valve port surface 171. The rod 159 is interposed between the non-spill valve body 155 and the check valve body 154 within the rod chamber 164.

The check valve body 154 is urged toward the butt connection side JB on the left side by means of the check valve spring 157 within the check valve chamber 166 so as to be butted on the check valve seat 172 of the check valve chamber 166 for closing the valve. The rod 159 transmits the movement of the non-spill valve body 155 toward the pull-off disconnection side ( the right side ) UB by an external force to the check valve body 154 so as to shift the check valve body 154 to its valve opening position. In this case, instead of the rod 159 formed separately from the check valve body 154, the rod may be formed integratedly therewith 154.

The non-spill valve body 155, on one hand, is urged to the butt connection side JB on the left side by means of the non-spill valve spring 158 within the non-spill valve chamber 163 so as to close the non-spill valve port surface 171 of the non-spill valve chamber 163 and, on the other hand, is urged to the pull-off disconnection side UB on the right side by an external force so as to open the non-spill valve port surface 171. Under the valve closed condition of the non-spill valve body 155, the front side space and the back side space thereof are communicated to each other through a fitting gap ( a communication passage ) 175 having a small cross-sectional area. Since the fitting gap 175 is very small, the non-spill valve chamber 163 is liquidly blocked by means of surface tension of the working oil.

The quick-acting coupling 26 having the above-mentioned construction operates as follows, as shown in FIG. 7 when the socket 51 and the plug 52 thereof are butted for the connection.

When the connecting manipulation is started under the disconnected condition as shown in FIG. 7(a), the advancement of the socket 51 is started and simultaneously the sealing contact portion 89 provided in the leading end surface of the sealing means 84 of the socket 51 is cleaned by the blow of the pressurized air ( the cleaning fluid ) F.

As shown in FIG. 7(b), a cleaning flow passage C for the pressurized air F is formed along the whole length between the fitting surrounding surfaces of the connecting receive mouth 61 and the connecting insert portion 161 under the midway condition of the connection between the socket 51 and the plug 52. Thereby, the pressurized air F ejected from the ejection holes 85 is adapted to be sprayed to the leading end surface 161a and the outer surrounding surface 161b of the connecting insert portion 161. Subsequently, as shown in FIG. 7(c), a space between both the fitting surfaces of the receive mouth 61 and the insert portion 161 is sealed by means of the sealing means 84.

Then, as shown in FIG. 7(d), the non-spill valve casing 56 is pushed to the pull-off disconnection side UA on the left side by means of the valve casing pushing portion 156 of the plug 52. Thereby, both the rods 59, 159 are butted to each other, and the rod 159 compresses the nonspill valve spring 158 so as to be butted on the check valve body 154.

Further, when both the non-spill valve bodies 55, 155 are butted to each other to be pushed toward the pull-off disconnection sides UA, UB, the following operations are carried out.

Firstly, as shown in FIG. 7(e), the check valve body 54 of the socket 51 compresses the check valve spring 57 so as to open the valve. Then, when the check valve body 154 of the plug 52 starts to compress the check valve spring 157 so as to open the valve, simultaneously both the non-spill valve bodies 55, 155 start to open the valves.

As shown in FIG. 7(f), all the valve bodies 54, 55, 154, 155 are shifted to their fully opened positions so as to complete the connection while the non-spill valve casing 56 is received within the coupling body 53.

In the case that the axes of both the couplings 51, 52 incline relatively at the time of connecting manipulation of the aforementioned quick-acting coupling 26, the alignment device 77 shown in FIG..4 functions as follows so that the connecting manipulation can be carried out smoothly.

That is, when the connecting manipulation is started, firstly the valve casing pushing portion 156 of the plug 52 swings the declination allowing ring 82 of the socket 51 about the non-spill valve casing 56 so that the axes of the plug 52 and of the declination allowing ring 82 coincide with each other. Then, the declination allowing ring 82 retreats the non-spill valve casing 56 toward the pull-off disconnection side UA within the eccentricity allowing casing 78 while allowing the eccentricity allowing casing 78 to move eccentrically through the non-spill valve casing 56. Thereby, the connecting manipulation can be carried out smoothly without any entanglement between the valve casing pushing portion 156 of the plug 52 and the socket body 53 of the socket 51.

To the contrary, when the socket 51 and the plug 52 are pulled off so as to be disconnected from the connected condition shown in FIG. 7(f), the following operations are carried out as shown in FIG. 7.

When the socket 51 is retreated to the pull-off disconnection side UA on the left side, the check valve spring 157 of the plug 52 is extended so that firstly, as shown in FIG. 7(e), the non-spill valve body 155 can be shifted to its valve closing position and the check valve body 154 can be also shifted to its valve closing position. Then, as shown in FIG. 7(d), the check valve spring 57 of the socket 51 is extended so that the check valve body 54 can be shifted to its valve closing position. While the non-spill valve casing 56 of the socket 51, the non-spill valve body 155 of the plug 52 and both the check valve bodies 54, 154 are pushed by means of the respective springs 57, 58, 157, 158 as shown in FIG. 7(c), the socket 51 and the plug 52 are disconnected as shown in FIG. 7(b).

In this case, while the socket 51 and the plug 52 are changed over from the connected condition wherein they are butted and connected to each other to the disconnected condition wherein they are disconnected by pulling off, the total operation lift L ( refer to FIG. 7(c) and FIG. 7(f) ) of the non-spill valve casing 56 brought about by the nonspill valve spring 58 toward the butt connection side JA is set larger by the sucking back lift N (refer to FIG. 7(d)) than the all-valve closing minimum lift M (refer to FIG. 7(d)) of the non-spill valve casing 56 required in minimum for the completion of the closing shifts of all the respective check valve bodies 54, 154 and the respective non-spill valve bodies 55, 155. Therefore, for the duration from the condition shown in FIG. 7(d) to the condition shown in FIG. 7(c), the pressures within the casing bore 56a of the non-spill valve casing 56 and within the non-spill valve chamber 163 are lowered to a negative pressure by the advancement of the non-spill valve casing 56 toward the butt connection side JA. Thereby, when changing over from the condition shown in FIG. 7(c) to the condition shown in FIG. 7(b), the working oil pooled in the inside circumferential space of the sealing means 84 is sucked back into the non-spill valve casing chamber 63 and non-spill valve chamber 163 so as to prevent the spill-out of the working oil perfectly.

Figure 12:
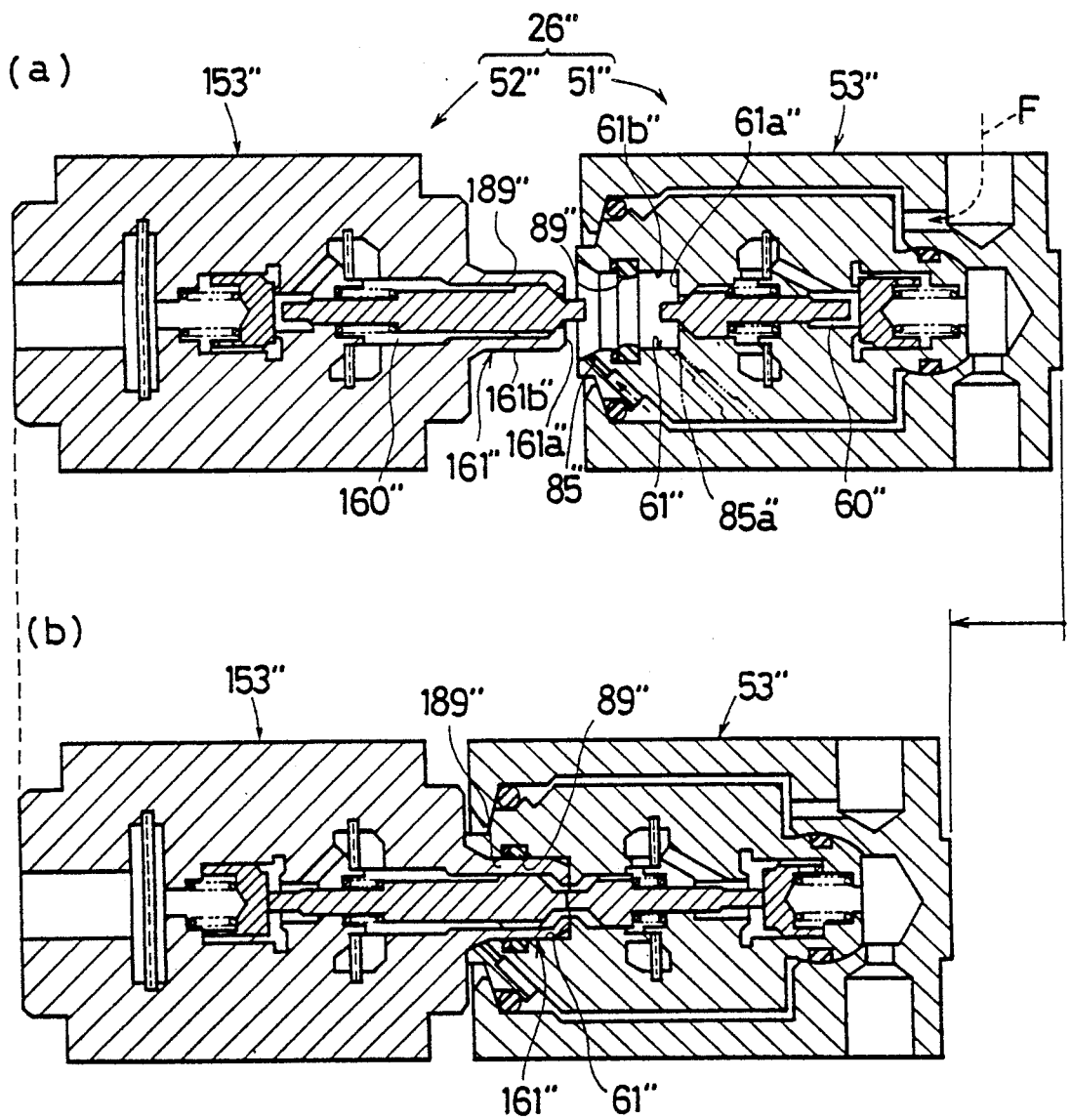

Since the cylindrical filters 68, 168 having large filtering capacities are mounted, as shown in FIG. 4, between the non-spill valve casing chamber 63 and the check valve chamber 66 and between the non-spill valve chamber 163 and the check valve chamber 166 where are provided a space communicating to the outside at the time of pulling off for the disconnection of both the aforementioned couplings 51, 52, the filter-changing frequency becomes less so as to save labor for the maintenance differently from the disk-like filter of the second conventional embodiment (refer to FIG. 12).

By the way, though the respective casing bores of the non-spill valve port surfaces 71, 171 are circular in the above-mentioned embodiment, they may be polygonal so as to receive the non-spill valve bodies 55, 155 having corresponding polygonal cross-sectional shapes.

Further, the respective communication passage for communicating the front spaces and the back spaces of the non-spill valve bodies 55, 155 to each other under the valve closed conditions thereof may be formed by small-diameter holes passing through the non-spill valve bodies 55, 155 instead of the fitting gaps 75, 175.

Further, though the plug 52 is provided with the check valve spring 157 and the non-spill valve spring 158 separately, the non-spill valve spring may be omitted by substituting the check valve spring for the non-spill valve spring.

Further more, though the aforementioned quick-acting coupling 26 employs the pneumatic cylinder 30 which serves to exert the external force for connecting and disconnecting the coupling 26, a man power may be used for such a connecting and disconnecting actuation. Instead of the working oil, other liquids may be used for the coupling.

Figure 8:
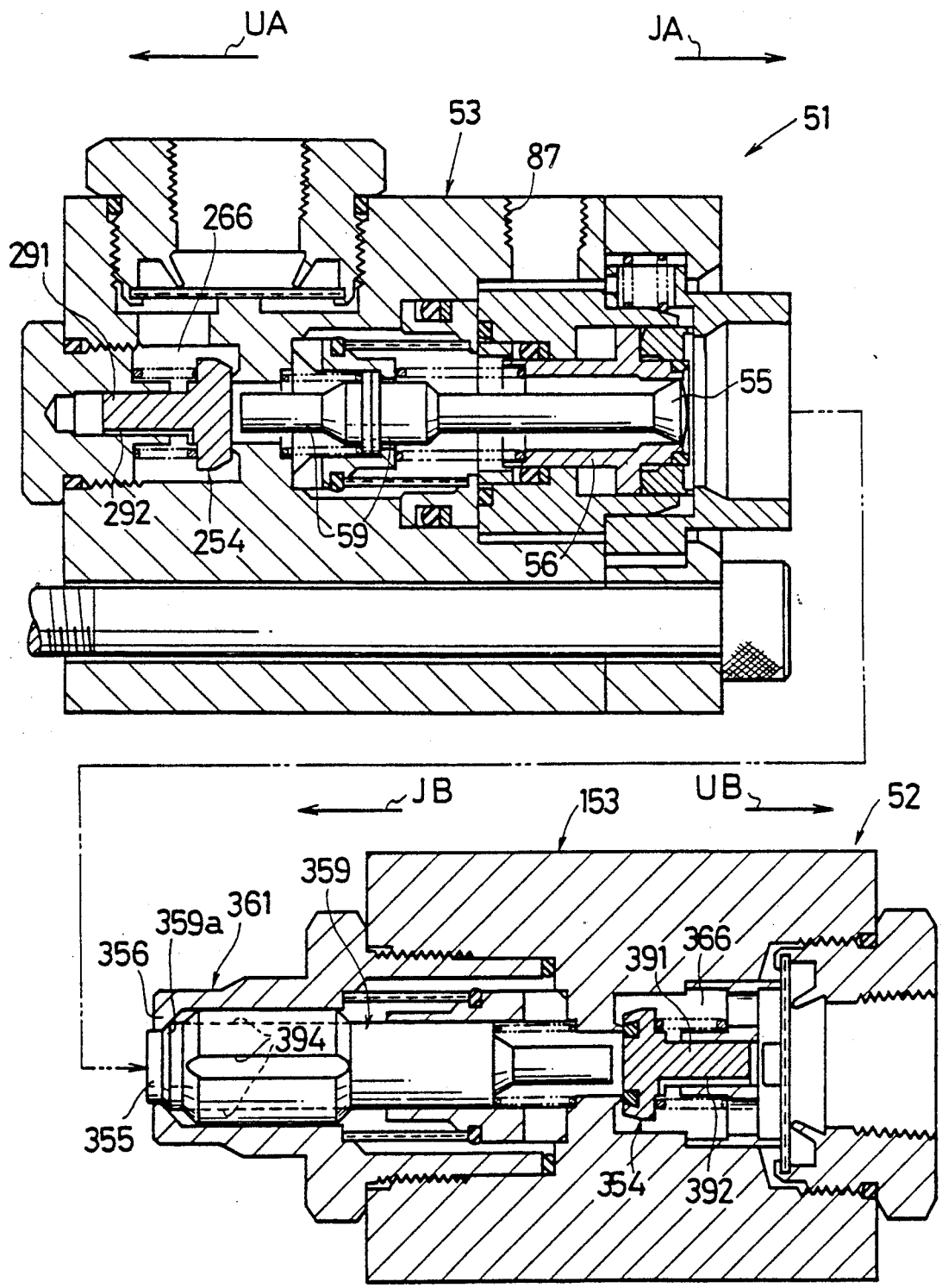
Figure 9:
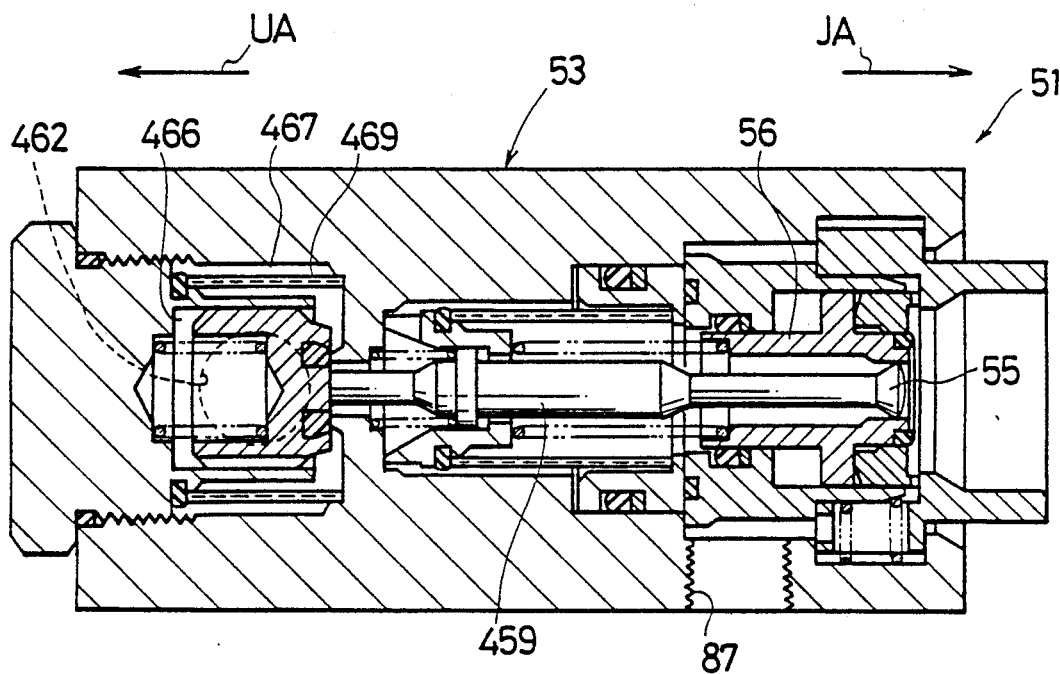
Figure 10:
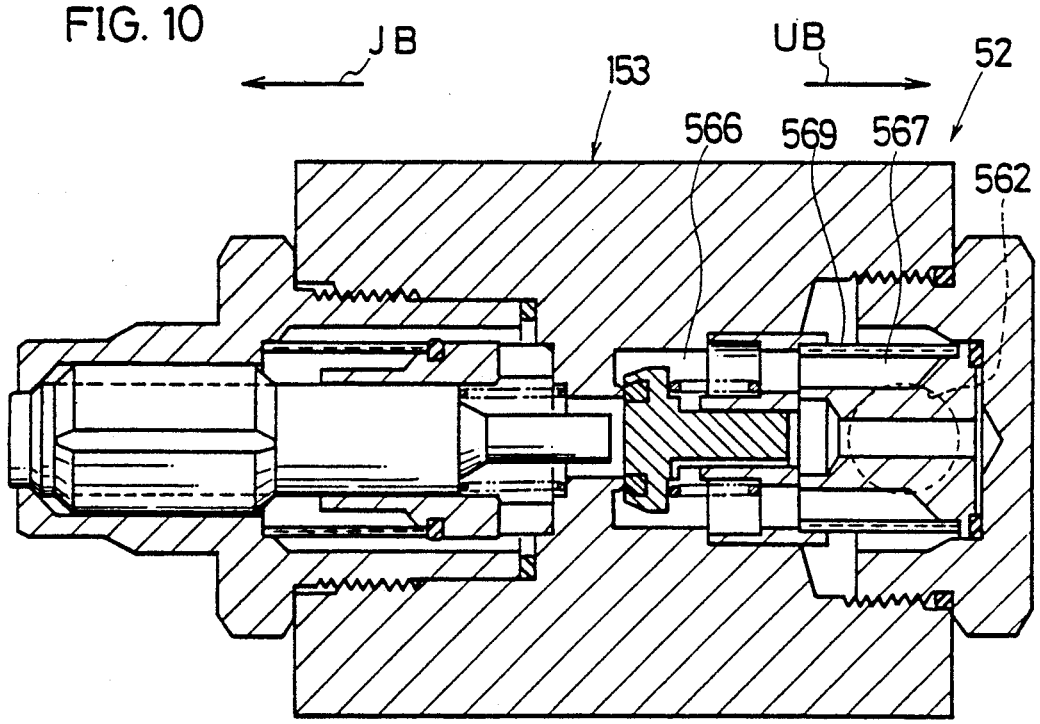
Figure 11:
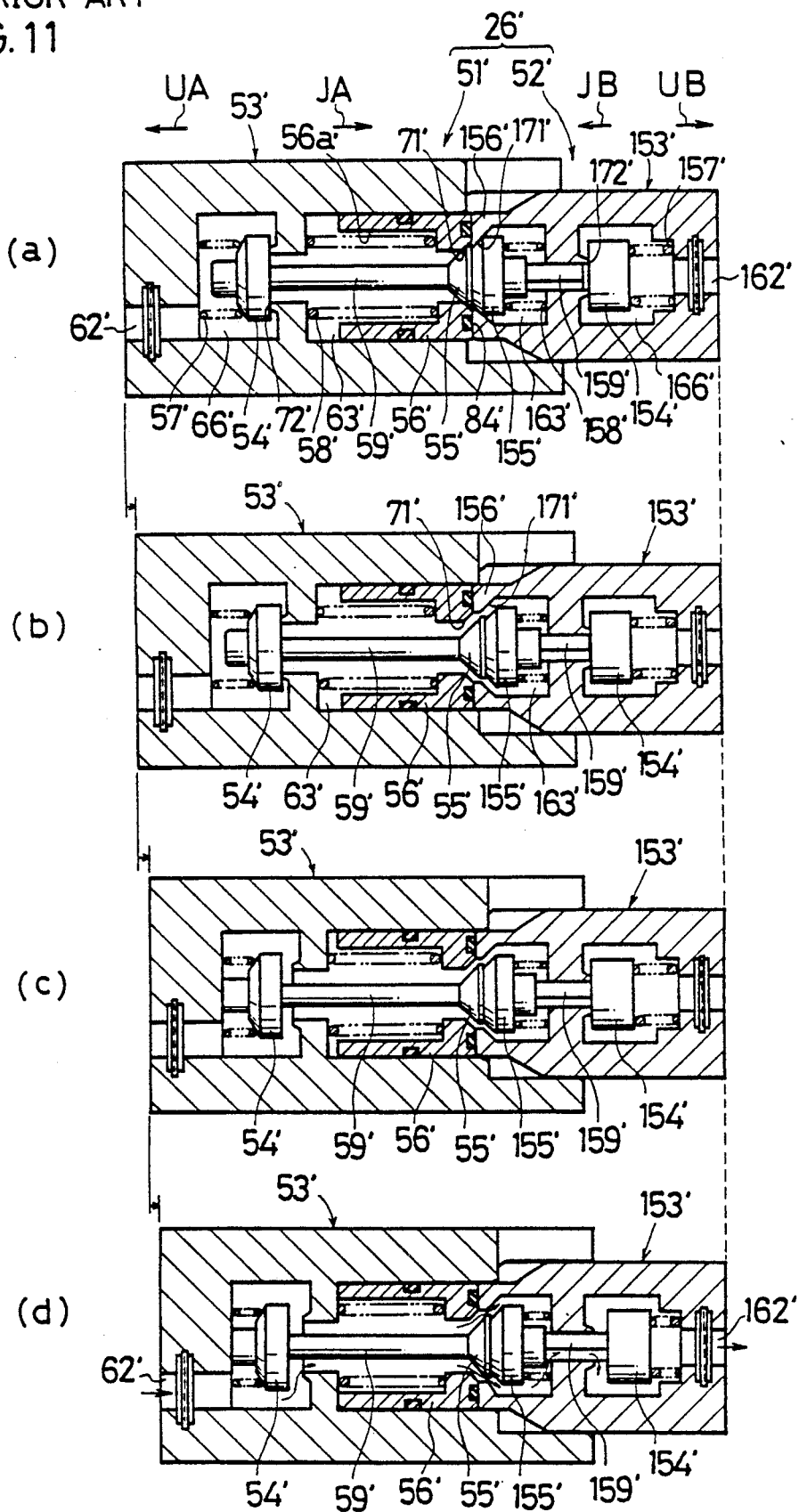
FIGS. 11 and 12 show conventional embodiments respectively.

FIGS. 8 through 10 show other embodiments respectively. The different constructions from the above-mentioned first embodiment will be explained. The component parts having the same functions as the ones in the first embodiment are designated by the same symbols in principle.

Second Embodiment

FIG. 8 shows a second embodiment.

Respective check valve bodies 254, 354 of the socket 51 as the first coupling and of the plug 52 as the second coupling are formed like a mushroom. Guide portions 291, 391 of the respective check valve bodies 254, 354 are fitted in the socket body 53 and in the plug body 153 respectively so as to be guided thereby. The respective guide portions 291, 391 are provided at their circumferential surfaces with oil supply grooves 292, 392 concaved therein. Since the check valve bodies 254, 354 are formed like a mushroom, wide flow passages can be provided in the outer circumferential portions of the check valve bodies 254, 354 within check valve chambers 266, 366. Therefore, flow resistance in the quick-acting coupling becomes smaller.

In the plug 52, the left end surface of a non-spill valve body 355 is projected outside the left end surface of valve casing pushing portion 356. Therefore, at the time of disconnecting manipulation of the quick-acting coupling, since an advancement stroke of the non-spill valve body 355 toward the left side with respect to the plug body 153 becomes larger, the spill preventive function is further improved. When the blow for cleaning is carried out by a pressurized fluid at the time of connecting manipulation of the quick-acting coupling, the leading end surface of the non-spill valve body 355 can be cleaned sufficiently by the blow because the non-spill valve body 355 is projected outside.

Further, in the plug 52, the left side outer circumferential surface of a rod 359 is fitted slidably in the connecting insert portion 361 of the plug body 153 so as to be guided therein. The rod 359 is provided at its fitting outer circumferential surface with a plurality of communication grooves 394 concaved therein so as to extend in the axial direction of the rod 359. Thereby, the rod 359 is guided smoothly and the non-spill valve body 355 can be prevented from being entangled.

Incidentally, the left shoulder portion 359a of the rod 359 is brought into contact with the valve casing pushing portion 356, and the opposite left and right sides of the contact portions are communicated to each other through concave portions of the rough surfaces by making the finishings of the respective contact portions rough.

Third Embodiment

FIG. 9 shows a third embodiment and is a vertical sectional view of the socket 51.

In this case, a rod 459 is formed as one piece. Therefore, since an accumulation of size errors can be removed from the longitudinal size of the rod 459 differently from the assembly rod comprising a plurality of rods arranged longitudinally, its dimensional accuracy can be enhanced readily. Further, since the rod 459 is manufactured as one piece, its manufacturing cost can be lowered.

A cylindrical filter 469 is mounted in an annular filter chamber 467 formed between a check valve chamber 466 and a liquid supply and discharge port 462. Accordingly, since the filtering capacity of the filter 467 can be enlarged, the maintenance for the socket 51 can be carried out readily.

Fourth Embodiment

FIG. 10 shows a fourth embodiment and is a vertical sectional view. This embodiment is obtained by modifying the plug shown in FIG. 8 as follows.

That is, a cylindrical filter 569 is mounted in an annular filter chamber 567 formed between a check valve chamber 566 and a liquid supply and discharge port 562. Accordingly, the filtering capacity of the filter 569 can be enlarged and the maintenance for the plug 52 can be made easy.

Incidentally, though the first coupling comprises the socket and the second coupling comprises the plug, the first coupling may comprise a plug and the second coupling may comprise a socket for providing a spill preventive function for the quick-acting coupling.

What is claimed is:

1. A quick-acting coupling with a fluid blow type cleaning device, comprising:

a socket-like first coupling (51) and a plug-like second coupling (52), a coupling body (153) of said second coupling (52) being provided at its leading end portion with a connecting insert portion (161), said connecting insert portion (161) having a leading end surface (161a) and an outer surrounding surface (161b), a second coupling side flow passage (160) being opened in said leading end surface (161a), and an annular sealing contact portion (189) being formed in said leading end surface (161a) along the opening edge of said flow passage (160), a coupling body (53) of said first coupling (51) being provided at its leading end portion with a connecting receive mouth (61) concaved therein, said connecting receive mouth (61) having an inmost end surface (61a) and an inner surrounding surface (61b), a first coupling side flow passage (60) being opened in the inmost end surface (61a), and an annular sealing contact portion (89) being formed in said inmost end surface (61a) along the opening edge of said flow passage (60), the inner surrounding surface (61b) of said connecting receive mouth (61) being provided at least at a plurality of locations in its circumferential direction with ejection holes (85) for ejecting a cleaning fluid (F), said ejection holes (85) being opened in the inner surrounding surface (61b) of the connecting receive mouth (61) at its inmost portion, and the axes of said ejection holes (85) being oriented in such a direction as to spray the cleaning fluid (F) onto the inmost end surface (61a) of the connecting receive mouth (61) and the sealing contact portion (89), under the midway condition of the connection between said first coupling (51) and said second coupling (52), a cleaning flow passage (C) for the cleaning fluid (F) being formed along the whole length between the fitting surround surfaces of the connecting receive mouth (61) and the connecting insert portion (161), and said cleaning fluid (F) ejected from the ejection holes (85) being adapted to be sprayed onto the leading end surface (161a) and the outer surrounding surface (161b) of the connecting insert portion (161) for the cleaning, and under the connected condition between the first coupling (51) and the second coupling (52), both the sealing contact portions (89) (189) being brought into contact with each other so as to seal between the fitting surfaces of the connecting receive mouth (61) and the connecting insert portion (161).

2. A quick-acting coupling as defined in claim 1, wherein the coupling body (53) of said first coupling (51) is provided at its leading end portion with a butt connection alignment device (77), said alignment device (77) comprises an eccentricity allowing casing (78), an inner casing (56) and a declination allowing ring (82), said eccentricity allowing casing (78) is disposed in the coupling body (53) hermetically and movably in an eccentric direction with respect to the butting direction thereof, said connecting receive mouth (61) is formed in the leading end portion of the eccentricity allowing casing (78), said inner casing (56) is accommodated within the end portion of the eccentricity allowing casing (78) hermetically and movably in the butting direction thereof, and said first coupling side flow passage (60) is provided within the inner casing (56), said declination allowing ring (82) is fitted externally onto the leading end portion of the inner casing (56) so as to be declinationally swingable, and said sealing contact portion (89) is provided in the leading end surface of the inner casing (56), and under the connection manipulating condition for butting and connecting the first coupling (51) and the second coupling (52) to each other, the sealing contact portion (189) of said second coupling (52) is adapted to push the inner casing (56) toward the inmost side through the sealing contact portion (89) and the declination allowing ring (82) of said first coupling (51).

* * * * *